(12) United States Patent
Mueckenheim et al.

(10) Patent No.: US 7,145,895 B2
(45) Date of Patent: Dec. 5, 2006

(54) METHOD AND SYSTEM FOR UMTS PACKET TRANSMISSION SCHEDULING ON UPLINK CHANNELS

(75) Inventors: Jens Mueckenheim, Nuremberg (DE); Stefan Gruhl, Nuremberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 958 days.

(21) Appl. No.: 10/109,400

(22) Filed: Mar. 28, 2002

(65) Prior Publication Data

US 2002/0181436 A1    Dec. 5, 2002

(30) Foreign Application Priority Data

Apr. 2, 2001    (EP) ................... 01303126

(51) Int. Cl.
*H04B 7/212* (2006.01)
*H04Q 7/00* (2006.01)

(52) U.S. Cl. .................. 370/348; 370/329
(58) Field of Classification Search ............ 370/329, 370/330, 340, 341, 338, 349, 352, 342, 441, 370/479, 468, 455, 522–3
See application file for complete search history.

(56) References Cited

U.S. PATENT DOCUMENTS

| | | | | |
|---|---|---|---|---|
| 5,914,950 A * | 6/1999 | Tiedemann et al. | ......... | 370/348 |
| 6,052,594 A * | 4/2000 | Chuang et al. | ............. | 455/450 |
| 6,252,891 B1 * | 6/2001 | Perches | ....................... | 370/503 |
| 6,449,462 B1 * | 9/2002 | Gunnarsson et al. | ...... | 455/67.13 |
| 6,847,629 B1 * | 1/2005 | Razoumov et al. | ......... | 370/349 |
| 6,901,060 B1 * | 5/2005 | Lintulampi | .................. | 370/329 |
| 2002/0089952 A1 * | 7/2002 | Cao et al. | ................... | 370/335 |
| 2002/0167907 A1 * | 11/2002 | Sarkar et al. | ............... | 370/252 |

FOREIGN PATENT DOCUMENTS

| WO | WO 98/45966 | 10/1998 |
|---|---|---|
| WO | WO 00/33589 | 6/2000 |

\* cited by examiner

*Primary Examiner*—Ricky Q. Ngo
*Assistant Examiner*—Warner Wong

(57) ABSTRACT

An improved method for packet transmission scheduling and an improved packet transmission scheduling system in mobile telecommunication systems. Both the improved method and the system especially adapted to be used for UMTS systems. A quality of service scheduling of multiple data flows in a mobile telecommunication system is proposed, wherein a priority order of protocol data units (PDU) of multiple data flows with regard to predefined flow's quality of service requirements is determined, a serving of the protocol data units (PDU) is performed by dynamically determining transport blocks (TB) to be transmitted by the physical layer (PHY-layer) with regard to the defined priority order and in dependence of allocated radio resource constraints, by assigning to each transport block (TB) a respective associated transport format (TF), and by creating transport block sets (TBS) with the determined transport blocks (TB) to be transmitted by the physical layer (PHY-layer) by using the respective associated transport format (TF) as assigned.

25 Claims, 5 Drawing Sheets

METHOD AND SYSTEM FOR UMTS PACKET TRANSMISSION SCHEDULING ON UPLINK CHANNELS

CROSS REFERENCE TO RELATED APPLICATION

This application claims priority of European Application No. 01303126.5 filed on Apr. 2, 2001.

FIELD OF THE INVENTION

The invention relates in general to a method for packet transmission scheduling and to a packet transmission scheduling system and specifically to a UMTS packet transmission scheduling method and to a system having UMTS packet transmission scheduling functionality.

BACKGROUND OF THE INVENTION

In particular, the invention addresses the problem of efficient scheduling of data flows, especially in Universal Mobile Telecommunication Systems (UMTS) for a transfer of data between at least one mobile station also termed user equipment (UE) and a so called NodeB of the core Network (CN), such as a local base transceiver station (BTS), i.e. for an UMTS Uplink shared Channel (USCH) between the mobile station and the base transceiver station.

As known, in packet switching networks the task of multiplexing essentially reduces to the task of ordering packets and to then send them serially over a shared link. This process of serialization is referred to as scheduling. The benefit of packet switching is based on the multiplexing gain, where some data flows benefit from unused resources from other temporarily inactive data flows. The disadvantage of this service compared to a circuit switched service is a lack of predictability in such systems. Significantly, predictability of system behavior is one important measure of quality. Some services, e.g. internet communication or facsimile transmission services need stronger Quality of Service or "QoS" guarantees than others as for example pure speech data transmission. Quality of Service (QoS) scheduling tries to balance the amount and timing of the received service for each flow according to the respective data flow requirements.

In the downlink data transmission, the radio access network has a complete or perfect knowledge of how much, when, and to whom packet transmissions are made or will have to be made within a certain interval of time, and hence a central controlled manner can be used without any explicit signaling transmission. For the uplink data transmission, however, the radio access network does not have such a complete or perfect knowledge. Thus, due to the lack of knowledge of e.g. transmission traffic volume and synchronization between a plurality of user equipment's (UEs) there is the need for some signaling between the UE and the NodeB, such as the UMTS-radio access network (UTRAN) of a Universal Mobile Telecommunication System (UMTS) to enable the radio network controller (RNC) to schedule the uplink traffic. Based thereon, some traditional uplink transmission schemes employ a random access scheme, e.g. according to the 3GPP UMTS standards. However, it would be desirable to use a controlled unit for uplink data transmission similar to a central controlled unit for downlink data transmission.

SUMMARY OF THE INVENTION

It is an object of the invention to provide an improved method for packet transmission scheduling, especially on uplink channels and an improved packet transmission scheduling system, both the improved method and the system especially adapted to be used for UMTS systems.

The inventive solution is characterized by a method, a system, a base and mobile station and in implementation software as set out in the claims.

Preferred refinements are the subject matters of the dependent claims.

Accordingly, the invention proposes and uses a QoS-scheduling for handling multiple data flows in a Code Division Multiple Access system by dynamically scheduling protocol data units in dependence of allocated radio resource constraints, using transport block sets for determined transport blocks to be transmitted by the physical layer by using respective assigned transport formats, resulting in the ensuring of the required data rates due to a rate conserving scheduling since an optimization of the usage of radio resources within at least two dimensions, i.e. with regard to a respective cell and to its adjacent cells is enabled.

The inventive QoS-scheduling preferably is apt to handle the data flows on uplink channels and can mainly be applied to scheduling of multiple data flows for different users on dedicated channels or on a shared channel but can also be applied to in the downlink direction.

According to preferred embodiments, the invention relies on two schedulers, which are linked together in a novel manner, whereby the first scheduler provides a certain degree of predictable behavior and the second scheduler provides Medium Access Control (MAC access) and also allows for bandwidth conserving segmentation and allocation strategies. Preferably these two schedulers are located centrally within the core network and each associated user equipment is incorporating a further scheduler executing decisions of the second scheduler.

The two central schedulers are named PDU scheduler and MAC scheduler. For the basics of this scheduling method reference is made to the co-pending European Patent Application 00 310 344.7, "Method of linking two schedulers of a multiplayer network and a network comprising a transceiver having linking functionality for two schedulers". A first adaptation, especially for the UMTS downlink is proposed in the co-pending European Patent Application 00 310 343.9, "Method and System for UMTS Packet Transmission Scheduling on Shared Downlink Channels". Since the present invention proposes a further improved scheduling method, especially adapted to the UMTS mobile communication system uplink direction, it may be seen as a complement to the downlink using an improved adaptation of the basic scheduling method. Consequently, the contents of both co-pending European Patent Application 00 310 344.7 and 00 310 343.9 are entirely incorporated to the disclosure of the present application by reference.

BRIEF DESCRIPTION OF THE DRAWINGS

The invention is described in view of preferred embodiments in more detail below and reference is made to the accompanying drawings, in which.

DETAILED DESCRIPTION

Figure 1:
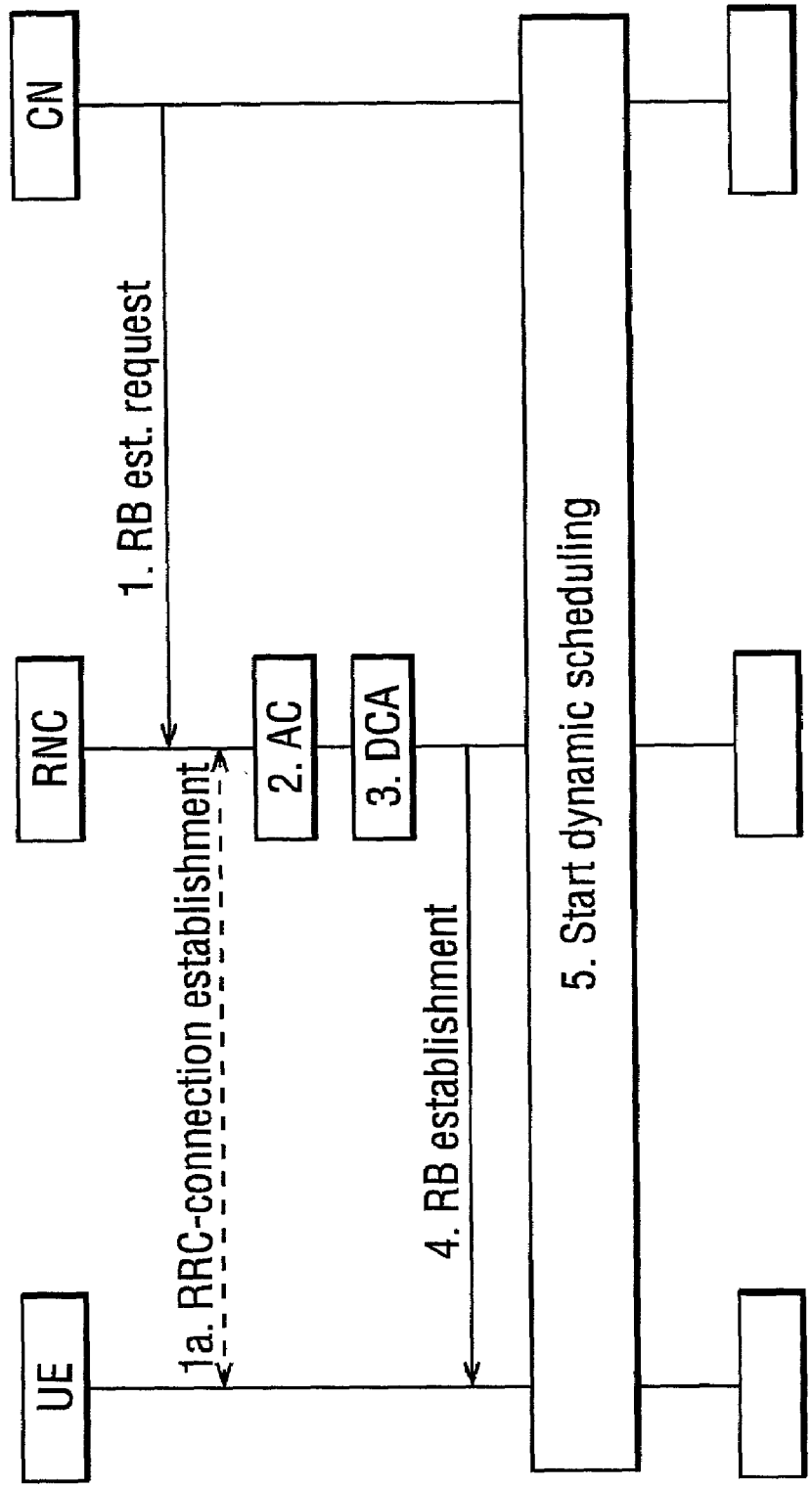
FIG. 1 shows a message flow between a core network and a or user equipment for adding a radio bearer to the scheduler.

For a better understanding of the invention and especially to ensure the improved performance of the inventive method and devices, certain requirements should be met and a number of assumptions are made in advance.

Assumptions and Requirements

A certain amount $\alpha_{schedule}$ of the overall uplink resource is allocated by the Radio Resource Management unit (RRM) to the scheduler radio bearer. The scheduler is apt to use $\alpha_{schedule}$ autonomously without invocation of the radio resource management unit (RRM).

If automatic repeat request (ARQ) is applied, the number of retransmissions is assumed to be significantly smaller than the regular traffic.

All transmissions having certain assigned quality requirements are embedded into a data flow. Accordingly, a data flow is defined as a sequence of data packets from the same source to the same destination in the network, for which the user has certain Quality of Service (QoS) requirements.

Each radio bearer is related to a single data flow. Because multiple radio bearers might be established for a single user, multiple data flows could exist simultaneously that are related to a single user, too. In the following description all data flows are handled separately.

Throughout this description the elements of a data flow are defined as Protocol Data Units (PDU or PDUs).

These PDUs are typically layer 3 elements from an UMTS point of view, but the invention is not necessarily limited to this. Protocol data units (PDUs) are segmented into transport blocks (TB or TB's), which receive their own headers, as specified in the UMTS 3GPP standards. This operation is associated with layer-2. Typically but no necessarily the transport blocks have a fixed size. An arbitrary number of transport blocks can be put together to one Transport Block Set (TBS). Typically but not necessarily only transport blocks of one protocol data unit (PDU) are put together.

One TBS is scheduled by the medium access control layer within the scheduling interval (typically 10 ms) to the physical layer (PHY-layer) per flow.

For the uplink channels controlled by the scheduler there are no soft handover (HO) assumed. Therefore, the scheduler handles the data flows addressed to user equipments (UEs) of the own cell, only.

Any mobility related procedures, e.g. hard handover are handled by the radio resource management system (RRM) independently.

The Bit Error Rate (BER) of a data flow is a static QoS requirement of the associated radio bearer. Depending on the delay constraints, there is a trade-off between Forward Error Correction (FEC), i.e. the received signal energy to noise ratio $E_b/N_0$ vs. Automatic Repeat Request (ARC) methods, i.e. the allowed number of retransmissions.

It is assumed that the required bit error rate always can be received from the core network or radio access network.

In order to optimize the bandwidth consumption of a data flow padding is minimized as a trade-off for delay where possible. This is indicated by the flow's QoS constraints and the recent flow status.

In order to optimize the delay, the whole protocol data unit (PDU) is taken by the PDU scheduler preferably at once.

The uplink channels preferably are time synchronized, i.e. every data flow starts its transmission in order that they are received at the same point of time. Thus, timing advance can be used which will be signaled to the UEs by higher layer before the first transmission starts. For moving UEs the timing advance has to be updated regularly. Generally, a discontinuous transmission (DTX) is not used on the uplink channels.

There is no physical multiplexing (or PHY MuX) for different data flows in the scheduled uplink channels. As a consequence thereof, the transport format combination sets (TFCS) on these transport channels consist of a transport format set (TFS) for one data flow, only. The transport format set is associated to the data rates $R_B$ of the respective data flow. The transport format sets are directly related to the spreading factor SF of the Code Division Multiple Access (CDMA) transmission system which is used to support that data rate.

The transport block size within one scheduling interval remains constant for each protocol data unit (PDU). Consequently, only the number of transport blocks needs to be counted for medium access control (MAC) scheduling.

Subsequently, the Radio Resource Allocation (RRA) according to the invention is described.

Basics on RRA for Uplink Channels

Due to its nature and in view of using a Code Division Multiple Access (CDMA) method, the main resource in the UMTS mobile communication system is the transmission power, which has to be spent for a certain user. The transmission power $P_{tri}$ of data flow #I is expressed as $$P_{tri} \approx \left(\frac{E_b}{N_0}\right)_i \cdot \frac{R_{Bi}}{W} \cdot \frac{I_0}{h_i} = K \cdot R_{Bi} \cdot C_i, \quad (1)$$

where $(E_B/N_0)_i$ denotes the to be received signal energy to noise ratio $(E_b/N_0)$ for data flow #i, $R_{Bi}$ denotes the current data rate used by flow #i, W is the chip rate, which chip rate at the moment is defined for UMTS as W=3.84 Mchip/s, $I_o$ denotes the interference at the NodeB of the cell where the user equipment (UE) is locatd and may include an intercell interference and thermal noise, and $h_i$ is the path-loss between the user equipment (UE) and Node B with $H_i \leq 1$.

However, the resources in CDMA systems depend not only on the data rate as handled by conventional scheduling methods or prior art schedulers but also on factors K and C which depend on several other parameters, like path-losses and interference. From equation 1 the factor K is given as $$K = \frac{E_b}{N_0} \cdot \frac{I_0}{W}. \quad (2)$$

The chiprate W usually is always known by the respective network used. The signal to noise ratio $E_b/N_0$ and the interference $I_0$, however, is preferably measured periodically in the NodeB and reported to the ratio network control unit (RNC) where the scheduling mechanism is located. According to equation 1, the $C_i$-value is the inverse of the path-loss $h_i$, i.e.

$$C_i = \frac{1}{h_i}. \quad (3)$$

The $C_i$-value is an essential part of the scheduling algorithm and is depending on the distance between the UE and the NodeB. If the UE is located nearby the NodeB, the $C_i$-value is nearly one. If the UE, however, is far away from the NodeB, then the $C_i$ increases to values much greater than one.

Preferably, the calculation of the $C_i$-value is carried out by use of one of the following three methods.

According to equation 3, the $C_i$-value can be directly obtained from the uplink path-loss. In this case, however, the UE has to report sometimes the estimated path-loss;

If a downlink channel exists, then the downlink path-loss might be used. By utilizing the associated downlink transmission power, which can be measured at the NodeB, the downlink path-loss may be obtained. However, to attain the $C_i$-value, an additional formula similar to the equation 1 has to be evaluated;

When location services are supported by the network, the path-loss may also be obtained from the knowledge of the UE position within the cell.

Moreover, there are two main restrictions for an uplink scheduling. The first one is based on the target to hold the interference of the respective own cell within a certain limit. Using a received signal power $P_{reci}=P_{tri} \, h_i$ and equation 1, the first restriction may be obtained by $$\sum_{i \in active} P_{reci} = K \cdot \sum_{i \in active} R_{Bi} \leq P_{max}(intra). \quad (4)$$

The second restriction is based on the target to hold the impact of transmissions from the respective own cell towards adjacent cells within a certain limit. Accordingly, this restriction may be obtained by $$\sum_{i \in active} P_{tri} = K \cdot \sum_{i \in active} R_{Bi} \cdot C_i \leq P_{max}(inter). \quad (5)$$

Consequently, based on these two main constraints, in the uplink there is an optimization problem not only in one dimension as compared to a downlink optimization but within two dimensions.

Moreover, due to limited capacities of e.g. a single channel transmission unit there is a further restriction of the transmission power of a single UE, too. This third restriction can be given by $$P_{tri} = K \cdot R_{Bi} \cdot C_i \leq P_{max}(UE), \; \forall i \in active. \quad (6)$$

Tasks and Functions of the Improved RRA

FIG. 1 shows a message flow between a Core Network CN, a Radio Network Controller RNC and User Equipment UE when a new radio bearer RB is added to the scheduling function.

Although it is an essential part of the exemplar UMTS mobile communication system, the base transceiver station (BTS) is not separately shown as these stations are well known to persons skilled in the art. According to FIG. 1, the following tasks and functions should be performed by the radio resource allocation units (RRA) before the scheduling function or operation starts:

1. RB Establishment Request: During this phase a new radio bearer RB establishment is requested from the Core Network CN. This request must contain or specify the quality of service (QoS) requirements of the associated flow, i.e. the requested bit error rates (BER), data rates to be transmitted and delay requirements. If there is no radio resource connection (RRC) established, a radio resource control connection establishment procedure between the radio network controller RNC and the user equipment UE has to be performed which is shown as step 1a in FIG. 1.

5. Start Dynamic Scheduling: After a successful establishment and initialization the new data flow is added to the scheduling function. The scheduling function will be performed now also for this flow. Reference is made to FIG. 1 showing the message flow for adding a radio bearer to the scheduler.

3. Dynamic Channel Allocation DCA: The Dynamic Channel Allocation procedure DCA allocates the following transmission parameters to the data flow (non exclusive): transport format set (TFS), radio link control (RLC) Info, new channelization code, initial transmission power etc. For the allocation method for transport format set and channelization code see also section "Allocation of Data Rates" of this description. New limits for the transmission powers $P_{max}$ (intra) and $P_{max}$ (inter) for the scheduler can also be allocated by DCA.

4. Radio Bearer Setup: This function performs a setup of the Radio Bearer and synchronization between the RNC and UE. Additionally, the base transceiver station will be initialized with the parameters that are allocated by DCA which is not shown in FIG. 1 but known to a person skilled in the art.

5. Start Dynamic Scheduling: After a successful establishment and initialization the new data flow is added to the scheduling function. The scheduling function will be performed now also for this flow. Reference is made to FIG. 1 showing the message flow for $_{adding}$ a radio bearer to the scheduler.

Allocation of Data Rates

The allocation of the data rates for each data flow has a strong impact on the system efficiency that the scheduler can achieve. The data rates relate to TFS and the channelization codes according to the assumption, that there is no physical multiplexing (or PHY MuX) for different data flows in the scheduled uplink channels. As a consequence thereof, the transport format combination sets (TFCS) on these transport channels consists of a transport format set (TFS) for one data flow, only. The transport format set is associated to the data rates $R_B$ of the respective data flow. The transport format sets are directly related to the spreading factor SF of the Code Division Multiple Access (CDMA) transmission system which is used to support that data rate. Thus, for a rough allocation or estimation of the limit data rates the following rules are applied:

For the maximum data rate $R_{Bmax}$ transport format sets (TFS) should be allocated to allow data rates up to two to four times of the maximum data rate, i.e. (2 to 4) $R_{max}$. There are two reasons for this requirement. The first is that these maximum transport format sets are required from the MAC-scheduler to serve a flow with a temporarily higher data rate than requested to let a flow profit from other flows being idle. This applies when there is remaining capacity on the air-link and if this flow has already data available to send in its transmission queue of its specific rate.

The second reason is to allow for a time divisional multiplex style multiplexing on the transport block level. The MAC-scheduler's algorithm can be developed towards bandwidth efficiency. Therefore it also may be desirable to use arbitrary sizes of transport blocks to minimize padding. This means the available transport format should be able to temporarily exceed specified rates.

Fairness, bandwidth and quality of service (BW-QoS) guarantees among flows are maintained by another scheduler, the PDU sceduler.

For the minimum data rates $R_{Bmin}$ transport format sets should be allocated to allow data rates below $R_{Bmin}$. The availability of smaller transport format sets allows the MAC-scheduler to minimize padding. As this introduces additional delay and lowers the average transmission rate, it is only applicable to certain QoS flows. The optimization of such allocation and transport format combination (TFC) usage is addressed separately.

In order to comply with the assumption that the uplink channels preferably are time synchronized, i.e. every data flow starts its transmission in order that they are received at the same point of time and a timing advance can be used which will be signaled to the UEs by higher layer before the first transmission starts, only those transport format sets are allowed which would fill up the whole data frame with data. Because the spreading factors of the channelization codes are in the order of $SF=2^k$, k=2, 3, . . . , according to the above-mentioned assumption, that there is no physical multiplexing, this leads to data rates of $R_B=R'_B \cdot 2^n$, n=0, 1, . . . , where $R'_B$ represents a reference data rate for a certain given spreading factor and may become $R_{Bmin}$.

Allocation of Transport Format Set (TFS)

The transport format set (TFS) is defined as the set of transport formats (TF) that are associated to one data flow. The semi-static part (coding, transmission interval, rate matching) essentially determines the bit error rate. It is defined by the radio resource management. In the following discussion, the focus is only on the dynamic part which consists of the transport block size and the transport block set size. The dynamic part of transport format sets can be used for optimization of the segmentation in the radio link control (RLC). For the choice of this dynamic part there is a trade-off between the granularity of the data rates and the limited size of transport format sets. On the one hand, each data flow intends to have a high granularity in data rates avoiding extensive padding. This would lead to a large transport format set size. On the other hand, a transport format set is used to enable efficient physical or PHY signaling for changing data rates. Due to limitations of that PHY signaling (e.g. TFCI (Transport Format Combination Indicator) encoding) the maximum transport format set size is quite limited. Therefore the following transport format set allocation rules regarding the characteristic of the data flow, similar to the downlink, are proposed and used according to the invention.

1. Real Time (RT) Services: This service type needs immediately serving of the offered data. Hence, a high granularity towards higher data rates is desired. Therefore, for real time services a larger transport format set should be allocated.

2. Non Real Time (NRT) Delay Sensitive Services: Here, a limited automatic repeat request (ARQ) can be used for protection of the data flow. The granularity is not as high as for the pure RT service because some data can be queued for a limited time. Therefore a limited transport format set can be allocated for such services. For efficient use of automatic repeat request mechanisms the transport block size should be small.

3. NRT Unconstrained Delay Services: This type of service is the best candidate for bandwidth optimization. In principle unlimited queuing is possible. Hence, no much granularity is necessary. Therefore a quite limited transport format set can be allocated for this service type. Granularity is used only to avoid padding, only.

Beyond the delay constraint it is sensible to take further QoS requirements and flow specifications into account. The system may potentially adapt to certain preferred PDU sizes, like that of a transport control protocol acknowledgement (TCP-ACK). Bulk data transfer could guard the selection towards max. PDU size, etc.

UL Channelization Codes

In the Uplink (UL), each UE preferably gets a unique scrambling code. Since the whole code tree can be used by one UE, a special management of the code tree is not necessary as compared to the Downlink. However, since some codes should be reserved e.g. for UL physical control channel, two alternatives are proposed for allocating the UL channelization code:

If pre-defined channelization codes are used, e.g. by following a fixed rule, then an allocation and signaling of the UL channelization codes are not necessary. The actual code sequence depends on the currently used data rate. However, the allocation has to be known by both entities, such as the UE and the UTRAN (UMTS Radio Access Network).

If the channelization codes are determined by the UTRAN, that is, the UTRAN allocates a certain code branch based on different data rates for the specific UE, then specific capabilities of some UEs might be considered. If each UE has its own code tree, the allocation rule is easier in comparison to the Downlink. However, the code branch has to be signaled to the UE.

Control of the Uplink Data Transmission

Due to the lack of knowledge of e.g. transmission traffic volume and synchronization between the UEs, some signaling must be applied between the UE and a UTRAN for enabling the RNC to schedule the uplink traffic.

Figure 2:
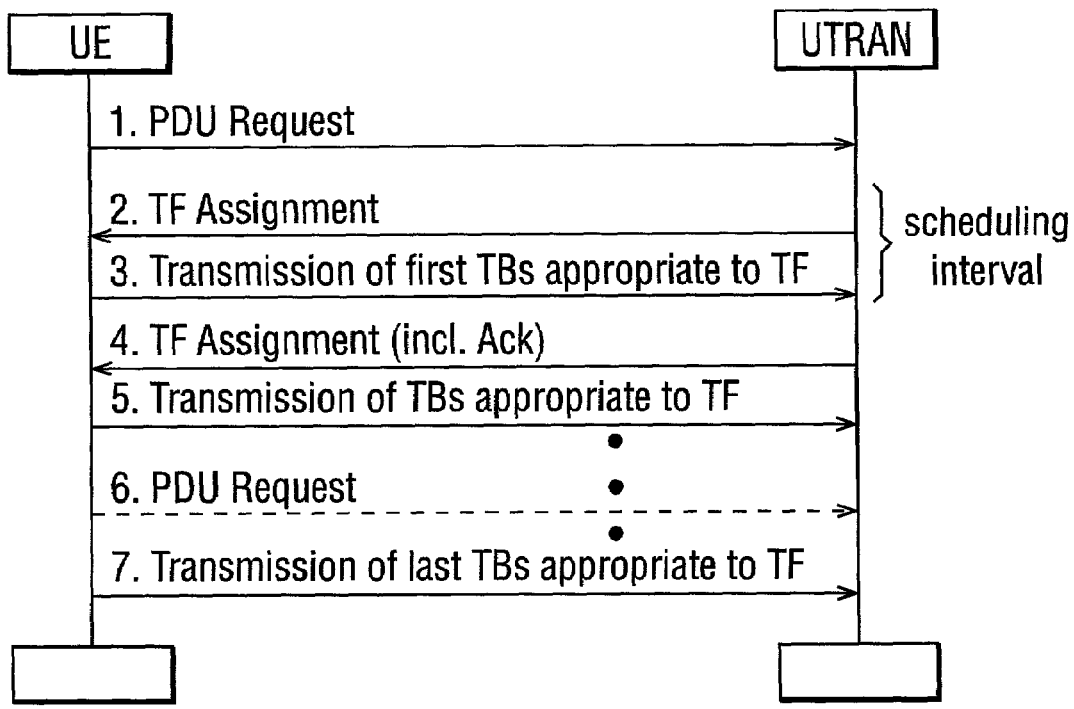
FIG. 2 shows a singaling flow during an uplink dynamic scheduling.

Reference is made to FIG. 2 showing the signaling flow between the UTRAN and a UE during the operation of uplink dynamic scheduling function. This function is similar to a distributed queuing request update multiple access (DQRUMA) as described for example by M. J. Karol et al., "Distributed-queuing request update multiple access (DQRUMA) for wireless packet (ATM) networks" in Proc. ICC'95, pp. 1224–1231, Seattle, Wash., the contents of which is incorporated to the present disclosure by reference. Mainly, the details depend on which transport channels will be used for this signaling. According to FIG. 2 the following signals and messages should preferably be identified.

1. PDU request: If the UE has a PDU to send, it will be stored in its own queue. The UE requests for the new PDU which is sent e.g. over a random access channel (RACH), when no other transport channel is active or over another currently active transport channel used by the UE. This request may contain the size of the PDU. Based on the request, the PDU scheduler determines the order of the PDU list, as described below under the section "PDU-scheduler".

2. TF assignment: The MAC-scheduler decides when and how many transport blocks (TB's) could be sent during a scheduling interval. The MAC-scheduler then informs the UE thereabouts by use of a transport format (TF) assignment message. This message is sent over some downlink channel, which can be an associated dedicated chennel (DCH) or a downlink shared channel (DSCH), too. The message may be piggybacked over user data.

3. Transmission of first TB's appropriate to TF: The UE sends the TB's to the UTRAN using the TF that was assigned. Therefore the PDU data in the UE, e.g. a mobile station MS is segmented to the TB's, ARQ is performed where applicable and the TBS is created for the given TF. A MAC-scheduler of the UE (UE_MAC) delivers the TB's to the PHY-Layer of the UE (UE_PHY) for sending and a pointer tot he next part of the PDU within the queue is updated within the UE.

4. TF assignment: After the scheduling interval the MAC-scheduler again decides on the transmission of the next TB's. If ARQ was applied, the new TF assignment message contains an acknowledgement for the previous sent TB's or in case of error the sequence number of erroneous TB's. When the scheduler decides that no TB's from the specific UE should be sent within the next scheduling interval, a TF assignment is not sent.

5. Transmission of next TB's appropriate to TF: The UE sends the TB's to the UTRAN as described in step 3. Erroneous acknowledged TB's will be inserted. If the network assigned no TFS, the UE does not send any data.

6. PDU request: There might be a new PDU request within the current MAC-scheduling flow. This should be handled independently on the ongoing transmission as described in step 3. Alternatively, the new PDU request can also be piggybacked to UL traffic.

7. Transmission of last TB's appropriate to TF: The signaling sequence of assignment and transmission will be continued until the last TB's will be transported. The UE indicates the end of the PDU, e.g. by appending a tag at the end of the data. After the UTRAN has sent the last acknowledgement, which is not explicitly shown in FIG. 2, the PDU can be deleted from the UE queue and the PDU list.

Subsequently the Scheduling Method according to the invention is described.

The invention contemplates the use of two schedulers, which are linked together to achieve a certain degree of predictable behavior, while also allowing for bandwidth conserving segmentation and scheduling, see also the referenced European Patent Application 00 310 344.7. These two schedulers are named PDU scheduler and MAC-scheduler, of which both are preferably located centrally in the RNC. Then, a third scheduler, i.e. a UE_MAC is incorporated in each user equipment UE for executing the decisions of the central MAC-scheduler.

The PDU-scheduler operates on the input data from Layer 3, the Protocol Data Units (PDU). It receives the QoS requirements of each flows and determines the order in which PDUs should receive service based on the availability of schedulable PDUs in a respective UE notified to the PDU-scheduler.

The MAC-scheduler serves the PDUs from this list and tries to reflect the order in the list, while also taking timing and power constraints into account.

Figure 3:
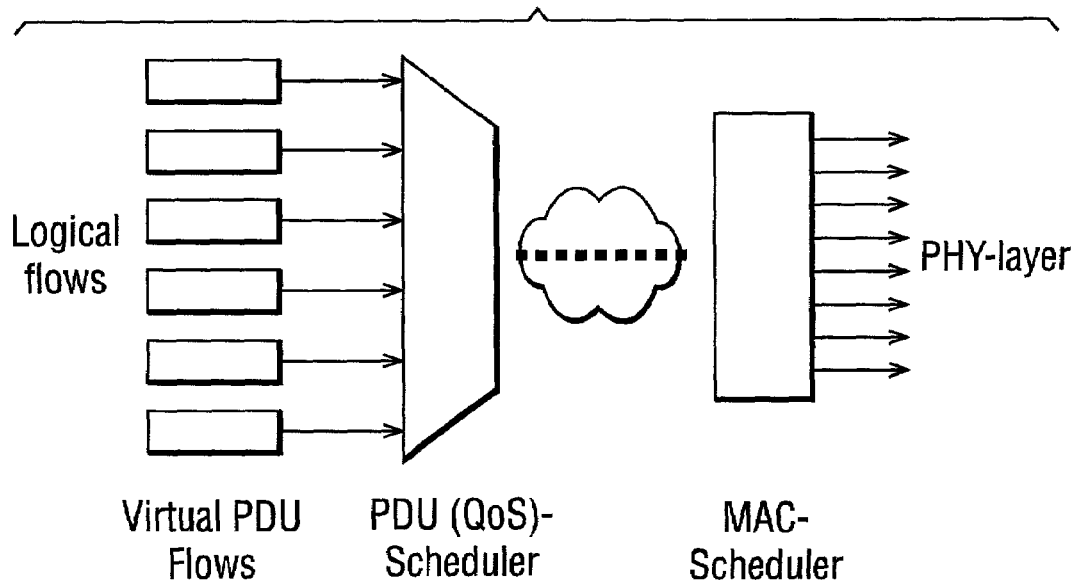
FIG. 3 shows principles of the quality of service (QoS) scheduling method in a radio network controller with virtual protocol data unit flows.

In FIG. 3 the principle architecture of the two serial schedulers is shown. The MAC-scheduler is active at every frame, e.g. on a 10 ms base. The PDU scheduler is operated on all active flows, i.e. with a non-empty PDU flow-queue. To avoid undesirable behavior of serially uncoupled schedulers, both schedulers are linked together by means that the MAC-scheduler is driven by the state of the PDU-scheduler.

Figure 4:
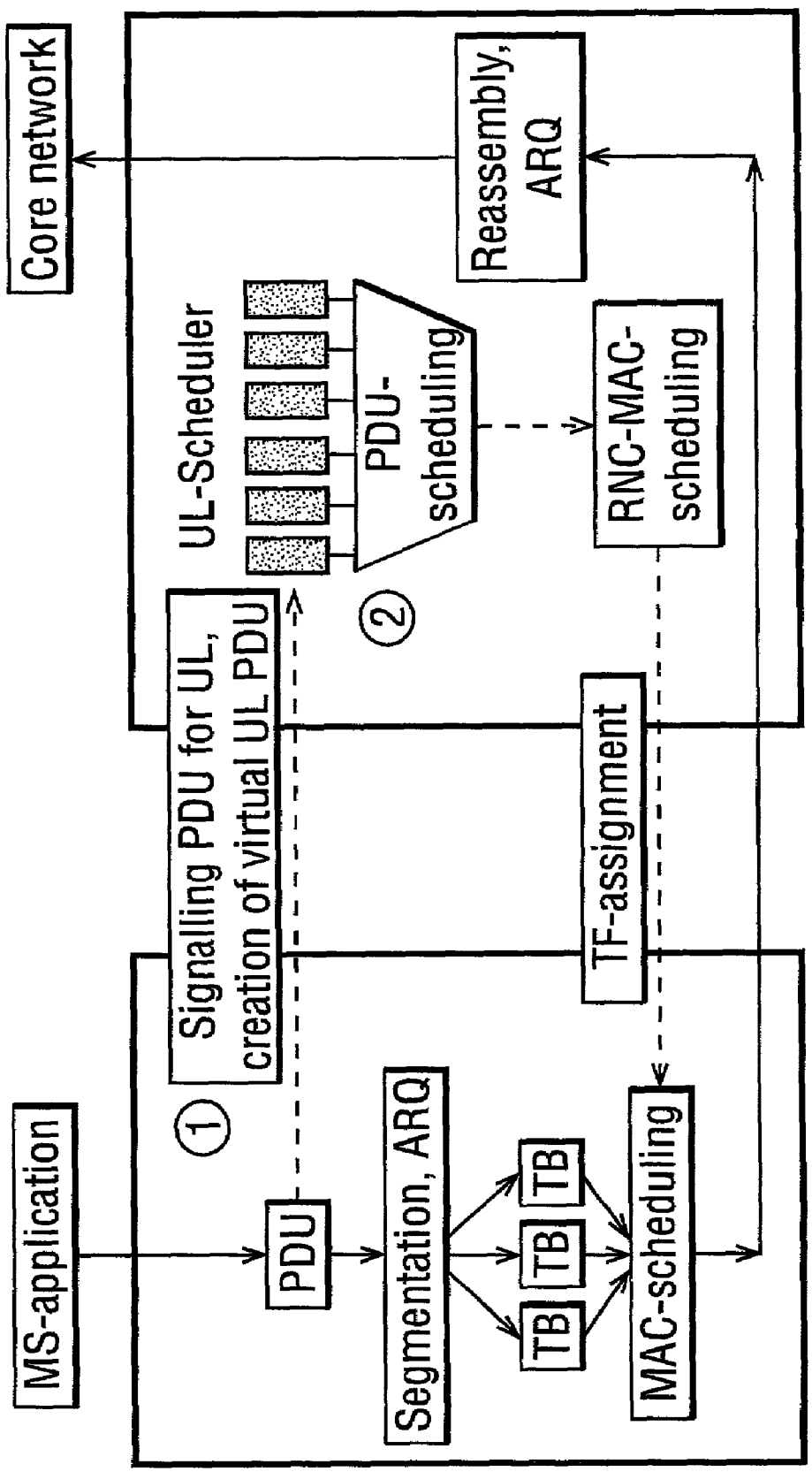
FIG. 4 shows a data flow upon a radio network Controller—Medium Access Control—scheduling.

According to FIG. 3 depicting the logical view of a RNC scheduling system in the uplink, there are virtual PDU flows. When a UE, such as a mobile station MS, signals a new PDU to be transmitted the PDU-scheduler is served by the MAC-scheduler, i.e. the MAC-scheduler bases the scheduling decisions on the PDU-scheduler's outcome. The MAC-decisions are then signaled to the lIE to drive the UE_MAC-schedulers operation. This operation involves the actual processing of user data, where the PDU in the UE is segmented, ARQ is performed, a TF is filled with TB and ultimately transmitted by the PHY-layer, as depicted in FIG. 4.

Principles of the PDU Scheduler

For the downlink, the principle funciton of the PDU-scheduler can be directly implemented as described by the referenced European Patent Application 00 310 343.9. However, in the Uplink the acutal data, i.e. the PDU is not physically present at the PDU-scheduler's place, but only the fact, that a PDU of a given size has to be scheduled is known to the PDU-scheduler. Thus, instead of real PDU flows, virtual PDU flows are processed in the PDU-scheduler and these virtual PDU flows are scheduled regarding their QoS requirements into one common list, denoted as the PDU list, reflecting a desired order of transmission as seen from the PDU-scheduler's side and providing the basis for MAC-scheduling decisions. This list is not termed a queue, because due to MAC-constraints it cannot be assured to serve this queue in a first input first output (FIFO) fashion. However, the PDU scheduler tries to serve the data with respect tot he required QoS parameters for each flows, e.g. data rates.

For this purpose any rate conserving scheduling policy can be applied, see for example Hui Zhang, "Service Disciplines for Guaranteed Performance Service in Packet-Switching Networks", Proceedings of the IEEE, Vol. 83, No. 10, October 1995, e.g. Weighted Fair Queuing ($WF^2Q$) or Virtual Clock Queuing (VCQ).

The scheduling elements for this scheduler are taken depending on the following rule: Typically the PDUs are large enough to be scheduled as one unit. In this case one scheduling element equals one PDU.

If it is possible to serve several PDUs simultaneously on theMAC-layer it may become desirable to have several PDUs available for MAC-scheduling from one flow. This would mainly be the case where PDUs become too small to be served with the required minimum data rate $T_{schedule}$ (typically $T_{schedule}$=10 ms ), i.e. when $$PDU_{len}/R_{Bmin} \leq T_{schedule}. \quad (7)$$

The problem can be overcome by having several PDUs from the flow grouped together into one container, which then becomes the scheduling element.

Hence, the scheduling element can be defined as one container that may consist of one (normally) PDU or several PDUs. Throughout this document one scheduling element is defined as PDU and the term PDU scheduler is used for the sake of simplicity.

As shown by J. Cobb et al. in "Flow timestamps" of the Annual Joint Conference of Information Sciences, 1995, it is equivalent for the considered scheduling method to work with flow time-stamps instead of PDU time-stamps. When doing so, the inventive PDU scheduler becomes active when a Pdu from a flow is fully served and therefore removed from the PDU list or when a formerly inactive flow gets reactivated by a PDU arrival into its empty PDU flow-queue. This is beneficial as it limits the number of elements in the PDU list tot he number of active flows.

Moreover, it also justifies that a UE only notifies the first PDU of a sequence of packets via a PDU request and notifies the subsequent PDU and their size piggybacked to the last MAC-transmission of each PDU. With only one PDU request a burst of PDU frames may be transmitted. Accordingly, there is no difference for the PDU-scheduler if all or only the next/current PDU is in the virtual PDU-flow.

Creating the Uplink PDU Scheduler

As mentioned above, in the Uplink there is the problem that the FIFO queues for the incoming data flows are located in each UE separately whereas the scheduling function is located preferably in the RNC within the network. Thus, the usage of a virtual PDU list is proposed, which preferably is created with reference to FIG. 4 as follows:

1. If a PDU is generated, the UE sends a "PDU request message" to the RNC (comparing also FIG. 2).

2. The RNC then (re)determines the order of all PDUs within the virtual list. This list may then be used by the MAC-scheduler as described subsequently in the sections relating to the MAC-Scheduler.

The place of each reported PDU is determined according to the data rate that was requested for the associated data flow and the PDU length. According to a very preferred refinement to easily get the length, the PDU length is explicit signaled e.g. via piggybacking. As an alternative, the PDU length may be estimated in the RNC without the knowledge of the exact length, preferably according to the following way.

The length on the first PDU is taken from a predefined estimate. For example, the length of a usual IP-packet for the requested service could be taken;

The length of the following PDUs is estimated from the length of the previous PDUs which are already known in the RNC when receiving an end of PDU tag from the UE. According to a preferred method the length of the directly preceding PDU may be taken. Of course, even a kind of average of more PDUs may be used for determining the current PDU length estimate;

As described in the section "Control of the Uplink Data Transmission" the PDU is not deleted from the list until the acknowledgement for the last TB of that PDU was sent.

Main Function of the MAC Scheduler

The MAC-scheduler serves the PDUs from the PDU scheduler. The order in the PDU scheduler's list signals the priority in which the PDU scheduler wants the PDU's to be served. Similar to the MAC-scheduler for the Downlink the MAC scheduler for the Uplink tries to achieve this while obeying at least four restricitons:

Bandwidth constraint due to TFC allocation of the flow and availability of a node in the code tree (refers to CBA);

Delay constraints drive the decision how many subsequent TBS transmissions spread over several timing intervals are tolerable to obey timing requirements of the served PDU;

ARQ-constraints, in that a transmission of TB's that receive ARQ service is only possible until the ARQ window size is reached and further transmissions are possible only after the ARQ stage receives the acknowledgement from the receiver;

Power constraints limit both the power for the transmission to one individual mobile and the overall power in the cell. To avoid RRM regulation on these issues, the scheduler should itself take this into account.

This present proposal mainly consists of a framework that allows for several MAC-scheduling algorithms to obey these constraints without having to explicitly worry for the flow's QoS requirements anymore, as this has been appied by the PDU scheduler already. Hence, in the following an algorithm is used complying with these constraints in a straight-forward manner. Later some improvements are shown.

Figure 5:
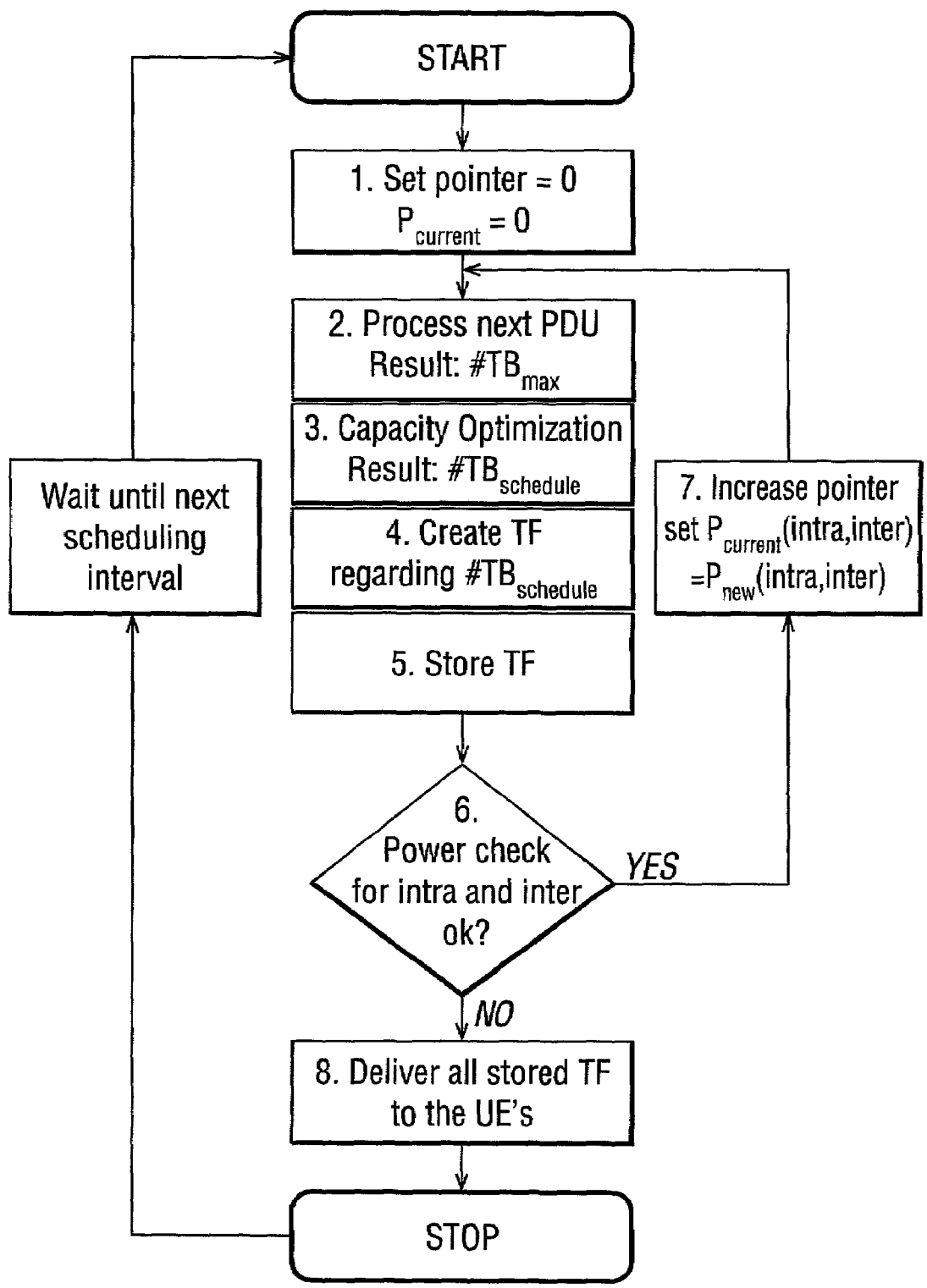
FIG. 5 shows an improved Medium Access Control scheduling mechanism.

According to FIG. 5, the basic mechanism for MAC scheduling essentially is the following:

1.) Set the queuing pointer in front of the PDU list, i.e. set pointer=0. Reset the current powers $P_{Current}(intra)=0$ and $P_{current}(inter)=0$.

2.) Take the next PDU from the PDU list and consider as much of it in means of TB for scheduling as it is constrained by:

PDU_size/segment size→result max #1 of TB's,

ARQ-constraint→result max #2 of TB's,

TFC-constraint→result max #3 of TB's,

Maximum UE transmission power $P_{max}(UE)$: $R_{bimax}=P_{max}(UE)/(K \cdot C_i)$ (cf. Equation 6), where K and $C_i$ are currently given by equation 2 or equation 3 → result max #4 of TB's, Intracell interference limit $P_{limit}(inter)$: Calculate the virtual available data rate $R_{bi1}$ (available)=$(P_{limit}(intra)-P_{current}(intra))/K$ (cf. equation 4)→result max #5 of TB's, Intercell interference limit $P_{limit}(inter)$: Calculate the virtual available data rate $R_{bi2}$(available)=$(P_{limit}(inter)-P_{current}(inter))/(K \; C_i)$ (cf equation 5)→result max #6 of TB's.

3.) Formal: Result $\#TB_{max}$=min (max #1 of TB's . . . max #6 of TB's). Perform capacity optimizing decisionson TBS creation. It can be advisable to schedule less TB's, with a smaller TBS than possible from the constraints in step 2. If no optimization is desired, chose max # of TB's from step 2.→new variable $\#Tb_{schedule}$.

4.) Create TF which is associated to $\#TB_{schedule}$. Set $R_{Bi}$ used regarding the created $\#TB_{schedule}$.

5.) Store the associated TF for signaling to the UEs in step 8.

6.) Compute the total intra cell power by $P_{new}(intra)=P_{current}(intra)+K \cdot R_{Bi}$ (used). Compute the total inter cell power by $P_{new}(inter)=P_{current}(inter)+K \cdot C_i \cdot R_{Bi}$ (used). Compare these values against the power limits $P_{limit}(intra)$ and $P_{limit}(inter)$.

7.) If total Power check is ok, i.e. if $P_{limit}(intra)-P_{new}(intra) \geq P_{min}(intra)$ and $P_{limit}(inter)-P_{new}(inter) \geq P_{min}(inter)$ ($P_{min}(intra,inter)$: minimum power for a certain # of TB's regarding intracell and intercell) and there are more PDUs in the PDU list, increase $P_{cell}$ by one to the next PDU in the PDU list, set $P_{current}(intra)=P_{new}(intra)$ and $P_{current}(inter)=P_{new}(inter)$ and go to step 2.

8.) Signal the stored TF to the UEs by using "TFS assignment" message as described in the section "Control of the uplink data transmission". This message is sent to all UEs having stored TF simultaneously.

Handling of the power limits $P_{limit}$ (intra,inter)

This section describes how the interference limits $P_{limit}$ (intra,inter) for the cell are allocated for MAC-scheduling. The limits $P_{limit}$ (intra,inter) for the scheduler should preferably be chosen according to the following rule:

$$P_{limit}(\text{intra,inter}) = \min\{P_{max}(\text{intra,inter}), P_{current}(\text{intra,inter}) + \Delta P_{inc}(\text{intra,inter})\}, \quad (8)$$

where $\Delta P_{inc}(\text{intra})$ and $\Delta P_{inc}(\text{inter})$ are certain increases of intra and inter Power, respectively.

The first term in equation 8 prevents the scheduler to use resources larger than the by RRM assigned $P_{max}(\text{intra})$ and $P_{max}(\text{inter})$. The second term guarantees that the increase in the current power $P_{current}(\text{intra})$ and $P_{current}(\text{inter})$ is below a given limit $\Delta P_{inc}(\text{intra})$ and $\Delta P_{inc}(\text{inter})$. The intracell limitation is useful in order that the UL power control for all users on other TrCH which are not handled by the scheduler (e.g. users on DCH) can follow the increase of transmission power. The intercell limitation protects the users from adjacent cells. For obtaining the current powers $P_{current}(\text{intra})$ and $P_{current}(\text{inter})$ the two following possibilities are preferred.

The values of $P_{current}(\text{intra})$ and $P_{current}(\text{inter})$ are directly taken as a result of the MAC-scheduler procedure, or from time to time the UEs may send a measurement report of its currently transmission power to the UTRAN. From these values $P_{current}(\text{intra})$ and $P_{current}(\text{inter})$ can also be estimated.

The basic limit definition according to equation 8 can be enhanced as following. For the purpose of efficient of the allocated radio recourses the MAC-Scheduler should monitor the goodput, i.e. the throughput $R_{actual}$ of the scheduler without retransmissions, which simply can be defined by $$R_{actual} = \sum_{i \in actual} R_{Bi}. \quad (9)$$

The virtual bandwidth is defined by the overall available data rate $R_{overall}$, which can be allocated by the MAC-Scheduler. This virtual bandwidth depends on the allocated powers $P_{max}(\text{intra})$ and $P_{max}(\text{inter})$ for the scheduler:

$$P_{overall} = \text{function}(P_{max}(\text{intra,inter})) \approx \min\{P_{max}(\text{intra}), P_{max}(\text{inter})/C'\}/K. \quad (10)$$

The value of C' represents a kind of estimate from the constants $C_i$ from all data flows. The goodput $R_{actual}$ is now compared with the virtual bandwidth $R_{overall}$. Depending on the comparison result the following actions can be taken:

If $R_{actual} < R_{overall}$, then there is a scheduling problem. The scheduler can process less data than required. In this case RRM has to be informed to take actions. This could involve to allocate larger resource $P_{max}(\text{intra})$ and $P_{max}(\text{inter})$ to the scheduler if available. If not, a dynamical resource reallocation to flows has to be performed. This could for example mean to drop or stop certain flows, that formerly were served with QoS BW guarantee. Finally this feedback can be used to alter capacity estimates for future Admission Control decisions.

If $R_{actual} \approx R_{overall}$, then the scheduler works efficient and within the limits. In this case equation 8 will be used as scheduling policy.

If $R_{actual} >> R_{overall}$, then the scheduler works in a relaxed manner. That means it is able to schedule much more data than actual required. In this case the scheduler can have a self limiting behavior depending on the history of the goodput $R_{actual}$ in the following way:

If $R_{actual}(t) \leq R_{actual}(t-1)$, then use the following modification of equation 8:

$$P_{limit}(\text{intra,inter}) = P_{current}(\text{intra,inter}) - \Delta P_{dec}(\text{intra,inter}), \quad (11)$$

where $\Delta P_{dec}(\text{intra})$ and $\Delta P_{dec}(\text{inter})$ are certain decreases f intra and inter Power, respectively.

if $R_{actual}(t) > R_{actual}(t-1)$, then use equatin 8 as it is.

This allows equalization of the total traffic in terms of traffic shaping. In order to keep the allocated resources available for the scheduling process RRM will not be informed about this self limiting. Nonetheless there will be a noticeable lower variation f power consumption which is beneficial for neighboring cells and DCH power control fluctuation in this cell.

Figure 6:
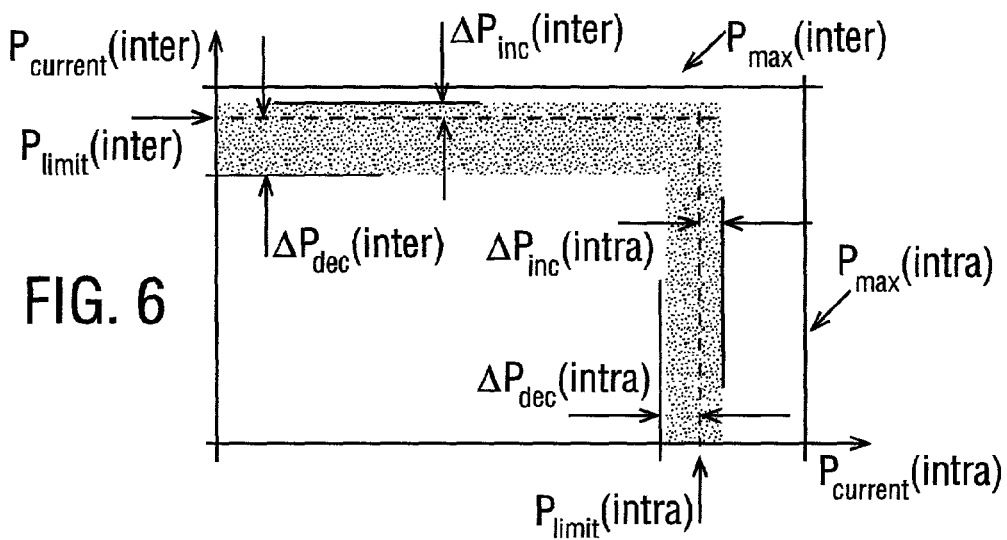
FIG. 6 shows how to handle power limits with the improved Medium Access Control—scheduler based on a preferred embodiment.

FIG. 6 illustrates an example of handling $P_{limit}(\text{intra,inter})$ in the $P_{current}(\text{intra,inter})$ plane. As mentioned above, the limits $P_{limit}(\text{intra,inter})$ can vary dynamically. For each dimension there are the following three possibilities:

If there is an increase of $P_{current}(\text{intra,inter}) > P_{limit}(\text{intra,inter})$, then $P_{limit}(\text{intra,inter})$ is increased by $\Delta P_{inc}(\text{intra,inter})$. The upper limits are given by $P_{max}(\text{intra,inter})$ that are allocated by RRM. This is the representation of equation 8.

If the interference decreases to $P_{current}(\text{intra,inter}) << P_{limit}(\text{intra,inter})$, then $P_{limit}(\text{intra,inter})$ can be decreased by $\Delta P_{dec}(\text{intra,inter})$. This is the representation of equation 11.

If $P_{current}(\text{intra,inter}) \approx P_{limit}(\text{intra,inter})$, then $P_{limit}(\text{intra,inter})$ does not change.

These variations are done in both dimensions, and preferably separately. Thus there is an area of possible variations around $P_{limit}(\text{intra,inter})$ that is marked by a shaded area in FIG. 6. Since all of these parameters can be adjusted independently, the scheduler offers a great flexibility.

Improvement of MAC-scheduling Decision

According to a preferred refinement, an improvement can be made that is similar to the downlink as described by the referenced European Patent Application 00 310 343.9. Especially for NRT services it is not necessary to always attempt to pack the whole PDU into one TBS to be scheduled in one MAC-scheduling interval. It might be desirable to spread the transmission in time over several scheduling intervals. Hence, the invention proposes and uses the following enhancement to section "Main Function of the MAC Scheduler".

Fr NRT-services for each PDU the maximum number $N_{schedule}$ of MAC-scheduling intervals $T_{schedule}$ that are allowed for an initial PDU transmissin is determined. The term initial means that this value does nt include potential retransmissions. The value $N_{schedule}$ is determined by:

$$N_{schedule} = PDU_{len}/(R_{Bmin} \cdot T_{schedule}). \quad (12)$$

Here, a system is assumed that obeys no other restrictions (e.g. ARQ . . . , see assumption mentioned above that if automatic repeat request (ARQ) is applied, the number of retransmissions is assumed to be significantly smaller than the regular traffic). Given this value for each PDU, the MAC scheduler can schedule less TB at a time. This may be motivated by several reasons. Firstly, the efficiency can be improved by reducing the padding. This is possible if there are several sized TF's defined that allow for the transmission in the next interval using smaller TBs, so less padding is needed. The variation of the created interference is also lowered when the data transmission is spread over several scheduling intervals instead of an on-off source behavior. This phenomenon is now investigated for inter and intra cell impact.

Figure 7:
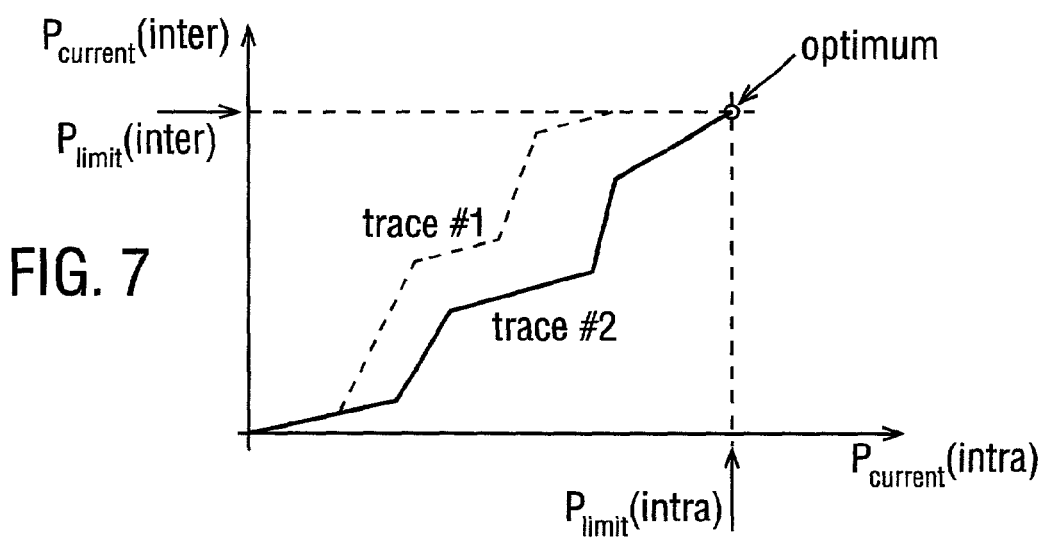
FIG. 7 shows adjusting traces of transmission powers during one Medium Access Control—scheduling interval.

In contrast to the downlink, in the Uplink the scheduling decision is based on a two-dimensional optimization problem resulting from the limitations for intracell and intercell interference. FIG. 7 illustrates the problem using the $P_{current}$(intra,inter) plane, again. From the power control/interference perspective there ideally would be no power variation at all, i.e. the same target point should be reached in every scheduling cycle. For practical applications this means, this point should move in a defined manner.

For example, looking at two intervals and two UEs equally sized packets is compared. Once they are transferred serially, i.e. the whole packet is sent from the UE which is close to the BTS first and then the whole packet from the UE which is far away from the BTS. This means the $P_{current}$(intra) and $P_{current}$(inter) is first low and then substantially higher, because more power is needed for the transmission of the far UE data.

In the alternative scheduling discipline described here, the data is split into half packets and both UEs or MS transmit their division of their data in both intervals. This means the $P_{current}$(intra) and $P_{current}$(inter) has a medium value for both intervals, i.e. the point in the graph according to FIG. 7 remains the same. Intuitively this is beneficial for PC algorithms. The basic idea is to select TF's in such a way that the summation of $P_{current}$(intra) and $P_{current}$(inter) are approximated to the value from the last scheduling interval.

For a more realistic example some traces for the vector of $P_{current}$(intra, inter) as a result of MAC scheduling method described in the section "Main Function of the MAC Scheduler" is shown in FIG. 7. Each segment of the trace represents the increase of $P_{current}$(intra, inter) after a certain number of TB's for one UE has been scheduled. From the interference point of view the optimum would be at the intersection of the lines for $P_{limit}$(intra) and $P_{limit}$(inter). From FIG. 7 trace #1 obviously offers not the optimal solution, because the limit of $P_{limit}$(inter) is reached while $P_{current}$(intra) is far away from its $P_{limit}$(intra). However, trace #2 reaches the optimum regarding the interference. Therefore optimizing the scheduler against interference is equivalent to finding a trace within the plane that reaches the optimum point. Since a person skilled in the art is able to find several methods for this optimization, the individual methods are not described in detail.

However optimizing the scheduling against the interference alone as mentioned above, may contradict the optimization against the QoS. To overcome this problem, a parameter $\beta=(0,\ldots,1)$ should introduced that indicates for:

$\beta=0$ an optimization against interference, only; e.g. trace #2 in FIG. 7;
  $\beta=1$ an optimization against QoS, only; e.g. trace #1 in FIG. 7; and
  $\beta$ between 0 and 1 an optimization on both having a trade-off between interference and QoS and the trace would be somewhere between trace #1 and trace#2 in FIG. 7.

The use of such a parameter offers a free choice on the preferred amount of interference optimization with regard to individual flow's QoS requirements. However, it has to be mentioned, that by use of the limitation rules in section "Handling of the power limits $P_{limit}$(intra, inter)", the limits $P_{limit}$(intra, inter) are dynamic, i.e., their intersection shifts towards the computed end points of the traces (cf. FIG. 6). In the non-optimal case (regarding interference), however, the limits could be far away from the allocated maximums, i.e., $P_{limit}$(intra, inter)<<$P_{max}$, (intra, inter).

Figure 8:
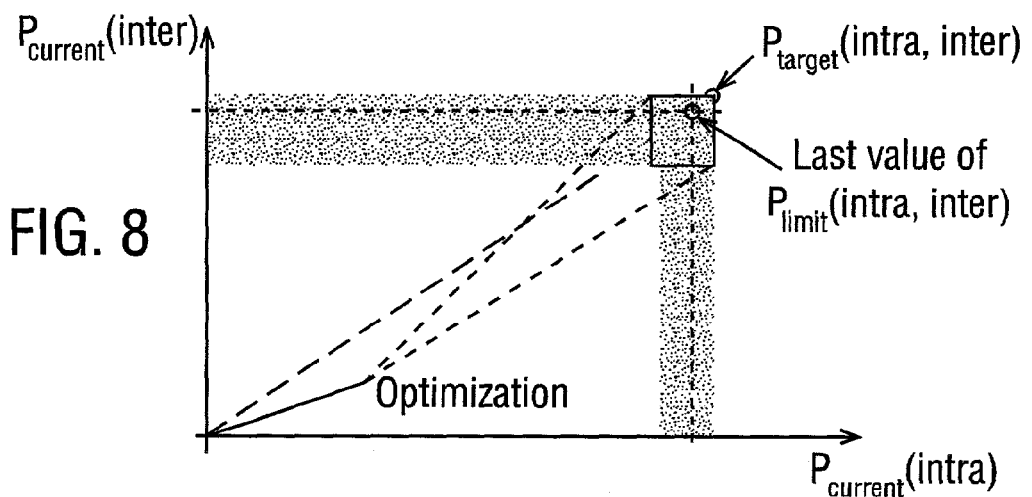
FIG. 8 shows an adjusting trace towards an optimized transmission power.

This principle is depicted in more detail in FIG. 8. As can be seen therefrom, the current setting of the limits is given by the point $P_{limit}$(inter, intra). Based on the aforementioned, the allowed changes of that limit within the next period as described in the section "Handling of the power limits $P_{limit}$(intra, inter)" gives a certain area, where the new limit can be moved. This area is depicted as the rectangle in FIG. 8. Optimization against only the interference ($\beta=0$) means, to set the end of the trace within this rectangular area. The point $P_{target}$(inter, intra) is the final target of the optimization. All other points within the area are sufficient solutions of the optimization problem against interference and suboptimal for the optimization problem of cell-capacity usage.

On the other side, optimization only against QoS ($\beta=1$) would lead to a trace that could be far away from the rectangular area. Therefore, the goal of combined optimization is to find an optimal $\beta$ resulting in a trace as close as to the rectangle while also optimizing the QoS constraints of those data flows where required.

CONCLUSION

This invention is not restricted to the specific embodiments described above. A person skilled in the art will recognize that based on a rate conserving strategy the scheduler guarantees the required data rates.

Even if a delay is not explicitly addressed by the scheduling principle, if each of the respective data flows is in compliance with its required quality of service and given admission control the scheduler guarantees that there will be no additional delay due to congestion within the scheduling system.

Preferably, bit error rate (BER) requirements are guaranteed in addition via properly forward error correction (FEC) and automatic repeat request (ARQ) functions.

A most preferred application of the improved scheduler is the handling of data flows in the uplink and the uplink scheduling was described in detail in the above description. It may be applied for controlling an uplink shared channel (USCH) and/or for coordinating the transmission on several dedicated transport channels to (DCHs). However, the inventive method of QoS scheduling is not limited to the uplink but also can be applied to downlimk channels.

The invention claimed is:

1. Method of scheduling multiple data flows for quality of service adjustment in a mobile telecommunication system for a transfer of data between the core network (CN) and at least one user equipment (UE) comprising the steps of:
  linking a first scheduler (PDU-scheduler) on an upper protocol layer and a second scheduler (MAC-scheduler) on a lower layer,
  receiving quality of service requirements of each data flow comprising protocol data units (PDU),
  determining a priority order of the protocol data units (PDU) to be served for data transmission on a communication channel, each protocol data unit (PDU) of a requested data flow to be transmitted being scheduled by the first scheduler (PDU-scheduler) with regard to pre-definable associated quality of service requirements into a priority list.

serving the protocol data units (PDU) by dynamically determining transport blocks (TB) to be transmitted by the physical layer (PRY-layer) with regard to the defined priority order and in dependence of allocated radio resource constraints, the step of serving being performed by the second scheduler (MAC-scheduler), assigning to each transport block (TB) a respective associated transport format (TF), and creating transport block sets (TBS) with the determined transport blocks (TB) to be transmitted by the physical layer (PHY-layer) by using the respective associated transport format (TF) as assigned.

2. Method of claim 1, wherein medium access control is performed by the second scheduler (MAC-scheduler) thereby optimizing the system efficiency of data transmission by dynamically operating on the protocol data units (PDU) within the priority list.

3. Method of claim 1, characterized by centrally locating the first and second schedulers (PDU) scheduler, MAC scheduler), and wherein the steps of serving and assigning are performed by the second scheduler (MAC-scheduler) and driven by the state of the first scheduler (PDU-scheduler), the assigned transport format is signaled to a respective user equipment (UE, MS) storing the associated protocol data units (PDU) to be transmitted, and the step of creating is performed by a third scheduler comprised by said user equipment (UE, MS).

4. Method of claim 1 characterized by creating a virtual protocol data unit (PDU) list to be served by the second scheduler (MAC-scheduler) in that a request for data flow transfer is signaled from a user equipment (UE, MS) to the first scheduler (PDU-scheduler) and the priority order of the protocol data unit (PDU) to be transferred is determined depending on a required data rate and an estimated length of the respective protocol data unit (PDU).

5. Method of claim 1, wherein the serving of the protocol data units (PDU) is performed periodically within scheduling intervals and depends on bandwidth, timing and/or power constraints.

6. Method of claim 1, comprising the adjusting of the transmission power required for a user equipment.

7. Method of claim 1, characterized by ensuring a minimum data transmission power and/or a maximum data transmission power for a user equipment.

8. Method of claim 7, characterized by an adjusting of the transmission power using predefined bit-error-rate requirements, interference estimations and path-loss estimations.

9. Method of claim 1, wherein an overall transmission power ($P_{limit}$(intra, inter)) within a cell is dynamically adjusted by taken into consideration the interference of said cell and the transmission impact from said cell towards adjacent cells.

10. Method of claim 9, wherein the adjusting of the overall transmission power ($P_{limit}$(intra, inter)) is comprising an adjustment step using the respective current transmission ($P_{current}$(intra, inter)) and a used data rate to the overall available data rate ration.

11. Method of claim 9, wherein the overall transmission power ($P_{limit}$(intra, inter)) of all active data flows is dynamically adjusted for a cell within limits predefined by respective allocated transmission powers ($P_{limit}$intra, inter)).

12. Method of claim 1, characterized by optimizing the current transmission power ($P_{current}$(intra, inter)) within a cell depending on the interference of said cell and the transmission impact from said cell towards adjacent cells and the required quality of service required for the data to be transmitted.

13. A mobile telecommunication system comprising a transceiver unit having means for providing a priority order of protocol data units (PDU) of multiple data flows with regard to predefined flow's quality of service requirements, for dynamically scheduling the ordered protocol data units (PDU) in dependence of allocated radio resource constraints, for assigning to the scheduled protocol data units (PDU) respective associated transport formats, for signaling the transport formats to means for creating transport block sets by using the dynamically scheduling results and the respective associated transport formats as assigned, and comprising two linked schedulers each operating on different protocol layers, wherein the scheduler (PDU-scheduler) operating on an upper layer schedules each protocol data unit (PDU) of a requested data flow to be transmitted into a virtual priority list to be served by the scheduler (MAC-scheduler) of a lower layer, and the scheduler (MAC-scheduler) of the lower layer performs medium access control thereby optimizing the system efficiency of data transmission by dynamically operating on the protocol data units (PDU) within the virtual priority list.

14. System of claim 13 comprising at least one transceiver unit having means for storing protocol data units (PDU) to be transmitted and for processing the protocol data units (PDU) in dependent on the scheduling results.

15. System of claim 13 comprising scheduling means for adjusting the transmission power required for a user equipment.

16. System of claim 13 comprising scheduling means for adjusting the transmission power subsequent to the establishment of a communication channel by using the respective previous transmission power and data rate ($R_{Bi}$).

17. System of claim 13 comprising scheduling means for monitoring for a cell an intracell interference and an intercell interference for adjusting an overall transmission power ($P_{limit}$(intra, inter)) within the limits predefined by allocated transmission powers ($P_{max}$(intra), $P_{max}$(inter)).

18. System of claim 17 comprising scheduling means for weighting individual data flow's quality of service requirements and said monitored intracell and intercell interferences for adjusting the overall transmission power ($P_{limit}$(intra, inter)) to an optimal target transmission power ($P_{target}$(intra, inter)).

19. System of claim 13 comprising scheduling means for monitoring the throughput without retransmissions and to compare said throughput with a virtual bandwidth depending on an allocated transmission powers ($P_{max}$(intra), ($P_{max}$(inter)) for adjusting an overall transmission power ($P_{limit}$(intra, inter)) within limits predefined by said allocated transmission powers ($P_{max}$(intra), $P_{max}$(inter)).

20. System of claim 13 comprising scheduling means for ensuring a minimum data transmission power and/or a maximum data transmission power for a user equipment.

21. System of claim 13 characterized in that the scheduler (PDU-scheduler) of the upper layer is operating with timestamps assigning every protocol data unit (PDU) or every data flow.

22. System of claim 13 characterized by a radio network control means comprising said two linked schedulers operating on the Logical-Link-Control-layer and on the Medium- Access-Control-Layer, respectively, and by a user equipment comprising a scheduler executing the decision of the scheduler operating on the Medium-Access-Control-Layer.

23. Method of scheduling multiple data flows for quality of service adjustment in a mobile telecommunication system for a transfer of data between the core network (CN) and at least one user equipment (UE) comprising the steps of:
linking two schedulers each operating on a different protocol layers,
receiving quality of service requirements of each data flow comprising protocol data units (PDU),
determining a priority order of the protocol data units (PDU) to be served for data transmission on a communication channel, each protocol data unit (PDU) of a requested data flow to be transmitted being scheduled by the scheduler (PDU-scheduler) on an upper layer regarding pre-definable associated quality of service requirements into a priority list to be served by the scheduler (MAC-scheduler) of a lower layer,
serving the protocol data units (PDU) by dynamically determining transport blocks (TB) to be transmitted by the physical layer (PHY-layer) with regard to the defined priority order and in dependence of allocated radio resource constraints,
assigning to each transport block (TB) a respective associated transport format (TF),
medium access control being performed by the scheduler (MAC-scheduler) of the lower layer thereby optimizing the system efficiency of data transmission by dynamically operating on the protocol data units (PDU) within the priority list,
creating transport block sets (TBS) with the determined transport blocks (TB) to be transmitted by the physical layer (PHY-layer) by using the respective associated transport format (TF) as assigned, and
creating a virtual protocol data unit (PDU) list to be served by the second scheduler (MAC-scheduler) in that a request for data flow transfer is signaled from a user equipment (UE, MS) to the first scheduler (PDU-scheduler) and the priority order of the protocol data unit (PDU) to be transferred is determined depending on a required data rate and an estimated length of the respective protocol data unit (PDU).

24. A mobile telecommunication system comprising a transceiver unit having means
for providing a priority order of protocol data units (PDU) of multiple data flows with regard to predefined flow's quality of service requirements,
for dynamically scheduling the ordered protocol data units (PDU) in dependence of allocated radio resource constraints,
for assigning to the scheduled protocol data units (PDU) respective associated transport formats, and
for signaling the transport formats to means for creating transport block sets by using the dynamically scheduling results and the respective associated transport formats as assigned,
and comprising scheduling means for monitoring the throughput without retransmissions and to compare said throughput with a virtual bandwidth depending on an allocated transmission powers ($P_{max}$ (intra), $P_{max}$ (inter)) for adjusting an overall transmission power ($P_{max}$(intra, inter)) within limits predefined by said allocated transmission powers ($P_{max}$(intra), $P_{max}$(inter)).

25. System of claim 24 and comprising two schedulers each operating on different protocol layers, wherein the scheduler (PDU-scheduler) operating on an upper layer schedules each protocol data unit (PDU) of a requested data flow to be transmitted into a virtual priority list to be served by the scheduler (MAC-scheduler) of a lower layer, and the scheduler (MAC-scheduler) of the lower layer performs medium access control thereby optimizing the system efficiency of data transmission by dynamically operating on the protocol data units (PDU) within the virtual priority list.

* * * * *